Patented Apr. 23, 1929.

1,710,584

UNITED STATES PATENT OFFICE.

CORNELIUS MASSATSCH, OF BERLIN, GERMANY, ASSIGNOR TO MATRO G. M. B. H., OF HEILBRONN-ON-NECKAR, GERMANY, A FIRM.

PROCESS FOR THE MANUFACTURE OF A THERAPEUTICALLY-ACTIVE IRON PREPARATION HAVING YEAST AS ITS BASIC SUBSTANCE.

No Drawing. Application filed December 21, 1927, Serial No. 241,732, and in Germany November 12, 1925.

This invention relates to the manufacture of a dietetic rich in nitrogen, phosphorus and iron by treating yeast with solutions of iron-salts. More especially, the invention consists in introducing a colloidal basic solution of an iron-salt into yeast suspended in water, separating the solid substances by filtration, and drying the product obtained. It is suited to the purpose to steep the starting yeast with about the tenfold of its weight of water and to treat it with colloidal forms of the iron hydroxide, as for instance a solution of iron oxide chloride or other solutions of a basic iron-oxide salt, also to deprive of the adhering water the product obtained by the filtration by alcohol and ether prior to the drying.

It has already been proposed to manufacture iron yeast compounds by causing an iron salt solution to act upon yeast and then neutralizing carefully the acid liberated during this action. There has been prescribed in the known process in view an addition of 100 grams of water to 1 kg. of dry yeast, in consequence whereof a uniform moistening through of the yeast is not attained. All products of transformation arising during the procedure remain in the yeast, render the final product impure and diminish its value, practically to zero so as to render it practically useless.

It has also been proposed to produce a metalliferous yeast, as well as other metalliferous micro-organisms, by causing strongly dissociated salts, such as silver nitrate and sublimate, to act upon the suspended yeast. The metalliferous nucleinates obtained in this manner show the peculiarity that when being treated with diluted salt solutions, even with water from the house water-supply main, they produce already complex compounds dissoluble in water. This behaviour must be counteracted by washing the metalliferous products finally with distilled water in order to remove the excess of salts and acids. Experience has shown, however, that this process is of no use where strongly dissociated iron salts are present, and besides, useful products are not obtained at all by it.

Now, according to the present invention, not dissociated salts, but colloidal, strongly basic iron salt solutions are employed. The contents of iron of the yeast which, in dry state of the yeast, amounts to only about 0.6% of the ashes, can be increased, according to this invention, in an extraordinarily simple manner without impairing in any way the known valuable properties of the yeast.

I am now giving an example: 10 grams of dry yeast or of so-called acetone permanent yeast are introduced into 100 c. c. m. of water and stirred therein, whereafter (the stirring being continued during this phase) 10 c. c. m. of commercial liquor ferri oxychlorati having a specific weight of 1.0478, or of pharmaceutic liquor ferri oxychlorati dialysati are introduced into said mixture. The new mixture thus produced is left during a night, but shaken repeatedly during this time, then filtered, the residue is freed from the adhering water by alcohol and ether, and finally completely dried at a low temperature.

The dust-fine product obtained is of a light-brown color, inodorous and tasteless and contains, for instance, 50% of nitrogen substance, 9.3% of ashes, 1.85% of phosphoric acid, and 3.6% of iron.

In another test carried through under the same working conditions, but with the use of double the amount of iron solution, a product containing 5.87% of iron was obtained.

Owing to the colloidal condition of the substance incorporated the yeast in question is, therefore, suited to precipitate colloidal iron products in finest distribution and in any desired amount, and also to bind them firmly. The basic substance, being a nourishing substance, is consumed in the body, and in the same measure in which this takes place, the iron is liberated and becomes active without any waste or, perhaps, flooding of the body. The high percentage of iron in the product ensures a general applicability of the same also in cases where concentrated iron actions are required.

I claim:

1. A process for the manufacture of a therapeutically active iron compound having yeast as its basic substance, consisting in introducing a colloidal basic iron salt solution into yeast suspended in water, separating the solid substances by filtration, and drying them.

2. A process for the manufacture of a therapeutically active iron compound having yeast as its basic substance, consisting in suspending the starting yeast in water amounting to about the tenfold of the weight of said yeast, treating the yeast with colloidal forms of iron hydroxide, filtering the mixture so as to separate the solid substances, removing the water adhering to the residue by alcohol and ether, and drying the product.

CORNELIUS MASSATSCH.